(12) United States Patent
Yokoyama

(10) Patent No.: US 11,947,136 B2
(45) Date of Patent: Apr. 2, 2024

(54) ANTI-NEWTON RING FILM, AND MANUFACTURING METHOD AND USE THEREOF

(71) Applicant: DAICEL CORPORATION, Osaka (JP)

(72) Inventor: Masashi Yokoyama, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 854 days.

(21) Appl. No.: 16/961,526

(22) PCT Filed: Feb. 15, 2019

(86) PCT No.: PCT/JP2019/005461
§ 371 (c)(1),
(2) Date: Jul. 10, 2020

(87) PCT Pub. No.: WO2019/187746
PCT Pub. Date: Oct. 3, 2019

(65) Prior Publication Data
US 2020/0355855 A1   Nov. 12, 2020

(30) Foreign Application Priority Data

Mar. 26, 2018   (JP) .................................. 2018-058876

(51) Int. Cl.
*G02B 5/02* (2006.01)
*C08F 265/06* (2006.01)
(Continued)

(52) U.S. Cl.
CPC ............ *G02B 5/021* (2013.01); *C08F 265/06* (2013.01); *C08J 5/18* (2013.01); *G02B 1/04* (2013.01);
(Continued)

(58) Field of Classification Search
CPC ...... G02B 5/0268; G02B 5/0278; G02B 5/02; G02B 5/0205–0221; G02B 5/0294;
(Continued)

(56) References Cited

U.S. PATENT DOCUMENTS

2010/0289762 A1* 11/2010 Ito .......................... C08J 7/046
345/173
2012/0032900 A1* 2/2012 Itoh ...................... C08J 7/0423
345/173
(Continued)

FOREIGN PATENT DOCUMENTS

CN          102713685 A    10/2012
JP          2009-258214 A  11/2009
(Continued)

OTHER PUBLICATIONS

International Search Report, issued in PCT/JP2019/005461, PCT/ISA/210, dated May 7, 2019.
(Continued)

*Primary Examiner* — Stephone B Allen
*Assistant Examiner* — Adam W Booher
(74) *Attorney, Agent, or Firm* — Birch, Stewart, Kolasch & Birch, LLP

(57) ABSTRACT

The anti-Newton ring film of the present invention is manufactured by subjecting a liquid phase containing one or a plurality of polymers, one or a plurality of curable resin precursors, and a solvent to phase separation through spinodal decomposition in association with evaporation of the solvent to thereby form a phase-separated structure, and then curing the curable resin precursor to form an anti-Newton ring layer having an arithmetic mean roughness Ra of 30 nm or less. This film may have a parallel light transmittance of 90% or greater, a haze of 3% or less, and a transmission image clarity of 90% or higher as measured by
(Continued)

an image clarity meter using an optical comb with a width of 0.5 mm. The anti-Newton ring layer may contain the polymer and the curable resin precursor at a ratio (weight ratio) of from 1/99 to 60/40. This film can effectively suppress the occurrence of a Newton's ring in a resistive touch screen, and can suppress glare even in a high-definition LCD and an organic EL display.

12 Claims, 4 Drawing Sheets

(51) Int. Cl.
  *C08J 5/18* (2006.01)
  *G02B 1/04* (2006.01)
  *G06F 3/045* (2006.01)

(52) U.S. Cl.
  CPC ......... *G02B 5/0268* (2013.01); *G02B 5/0278* (2013.01); *G06F 3/045* (2013.01); *C08J 2351/00* (2013.01)

(58) Field of Classification Search
  CPC ... G02B 1/04; C08F 265/06; C08J 5/18; C08J 2351/00; G06F 3/045; C08L 33/10; C08L 33/12
  See application file for complete search history.

(56) References Cited

U.S. PATENT DOCUMENTS

| | | |
|---|---|---|
| 2012/0070614 A1 | 3/2012 | Takahashi et al. |
| 2012/0229423 A1 | 9/2012 | Takamiya et al. |
| 2015/0015812 A1* | 1/2015 | Takakusagi ........... G06F 3/0444 349/12 |
| 2017/0022343 A1* | 1/2017 | Sakakibara ............. C09D 7/61 |
| 2017/0052288 A1* | 2/2017 | Ludemann ......... G02B 27/0025 |

FOREIGN PATENT DOCUMENTS

| | | |
|---|---|---|
| JP | 2011-2820 A | 1/2011 |
| JP | 2011-175601 A | 9/2011 |

OTHER PUBLICATIONS

Written Opinion of the International Searching Authority, issued in PCT/JP2019/005461, PCT/ISA/237, dated May 7, 2019.
International Preliminary Report on Patentability and English translation of the Written Opinion of the International Searching Authority (PCT/IB/338, PCT/IB/373 and PCT/ISA/237) dated Oct. 8, 2020 for Application No. PCT/JP2019/005461.
Office Action dated Sep. 8, 2021, in Chinese Patent Application No. 201980014991.X.

\* cited by examiner

ANTI-NEWTON RING FILM, AND MANUFACTURING METHOD AND USE THEREOF

TECHNICAL FIELD

The present invention relates to a film for preventing or suppressing a Newton's ring that occur in resistive touch screens, a method of manufacturing the same, and a usage method and applications thereof.

BACKGROUND ART

With advance in recent years in electronic displays as man-machine interfaces, interactive input systems have become ubiquitous, and among these, devices in which a touch screen (coordinate input device) is integrated with a display have been widely used in applications such as automated teller machines (ATMs), product management, outwork (diplomacy, sales), guide displays, and entertainment devices. Lightweight, thin displays such as liquid crystal displays can realize a keyboard-less design, and because of this merit, the use of touch screens in mobile devices is increasing. Touch screens can be classified into optical method-based, ultrasound method-based, capacitive method-based, and resistive film method-based touch screens, etc. according to the method of position detection. Of these methods, the resistive film method has features that include a simple structure and an excellent cost/performance ratio.

A resistive touch screen is an electrical component configured by holding two films or plates, each having a transparent electrode, at a constant interval while the transparent electrode sides are facing each other. In its operation, one of the transparent electrodes is fixed, and a user presses the other transparent electrode using a pen or finger from the viewing side, causing the transparent electrode to bent and to contact the fixed transparent electrode, thereby establishing an electrical connection. Then, a detection circuit senses the position, and a predetermined input is made. During such an operation, when the user presses the other transparent electrode using a pen or a finger, a rainbow pattern (interference colors or interference fringes called a "Newton's ring") due to interference may appear around the finger, pen, or other such pointing tool pressing the transparent electrode, and as a result, the visibility of the screen may be impaired. Specifically, when the two transparent electrodes contact or bend due to contact, and the interval between the two opposing transparent electrodes is reduced to around the wavelength of visible light (approximately 0.5 µm), interference of reflected light occurs in the space sandwiched between the two transparent electrodes, causing an appearance of a Newton's ring. The appearance of such a Newton's ring is an inevitable phenomenon, because of the principle of resistive film based touch screens.

As a countermeasure to mitigate the appearance of the Newton's ring in such touch screens, a method of forming a recessed and protruding structure on a surface of a support film having a transparent electrode has been proposed.

JP 2011-2820 A (Patent Document 1) discloses an anti-Newton ring film that can effectively suppress the occurrence of a Newton's ring in a resistive touch screen, the film including an isotropic scattering anti-Newton ring layer containing a polymer and a curable resin precursor, and having a surface of a recessed and protruding structure formed by a phase-separated structure. Patent Document 1 indicates that the haze of the anti-Newton ring film can be selected from a range from 0.1% to 50%, and the haze in the examples is from 3.6% to 19.9%. Patent Document 1 also indicates that the transmission image clarity (0.5 mm wide optical comb) of the anti-Newton ring film is from 50% to 100%, and the transmission image clarity in the examples is from 65% to 80%.

However, while this anti-Newton ring film excels in the anti-Newton ring property, visibility is reduced due to the scattering of light. In recent years, even with resistive film touch screens, measures to achieve higher definition in image display apparatuses (devices) such as liquid crystal display devices (LCD) and organic electroluminescent (EL) displays have progressed, and with this anti-Newton ring film, the size of the surface recesses and protrusions has approached an order of the pixel size of high-definition displays, and glare occurs due to the lens effect caused by these surface recesses and protrusions.

JP 2016-22661 (Patent Document 2) discloses, as an optical laminate that can suppress reflection, a Newton's ring, and glare and exhibits low total haze and low internal haze, a laminate that includes: a light transmitting substrate, and an optical layer that is laminated on the substrate and has a specific recessed and protruding shape on a surface thereof. In this optical layer, inorganic oxide microparticles having an average primary particle size from 1 to 100 nm, and organic microparticles having an average primary particle size of less than 8 µm are used to form the recessed and protruding shape, and in the examples, silica microparticles having an average primary particle size of 12 nm, and acrylic-styrene copolymer particles having an average primary particle size of 2 µm are blended. Patent Document 2 indicates that the optical laminate can be used as an optical laminate with a touch screen, and is suitable for a capacitive touch screen.

However, because this optical laminate contains particles, issues such as localized differences in levels occur, and the uniformity of the recessed and protruding structure of the surface is low. Furthermore, strength and rigidity are not sufficient, and while this is not a problem for capacitive touch screens, when resistive touch screens are used repeatedly for a long period of time, the function, performance, and durability as a touch screen are reduced.

CITATION LIST

Patent Document

Patent Document 1: JP 2011-2820 A (claim 1, paragraphs [0080] and [0081], and the examples)
Patent Document 2: JP 2016-22661 A (claims, paragraphs [0016], [0065], and [0123], and the examples)

SUMMARY OF INVENTION

Technical Problem

Accordingly, an object of the present invention is to provide an anti-Newton ring film that can effectively suppress the occurrence of a Newton's ring in a resistive touch screen, and can suppress glare even in a high-definition LCD and an organic EL display, and to provide a manufacturing method and a usage method of the same, and applications thereof (an electrode substrate for a resistive touch screen provided with the film, and a touch screen).

Another object of the present invention is to provide an anti-Newton ring film that excels in durability without reducing the Newton ring preventing effect even when used repeatedly, and to provide a manufacturing method and a usage method of the same, and applications thereof.

Solution to Problem

As a result of diligent research to achieve a solution to the abovementioned problem, the present inventors discovered that when an anti-Newton ring layer containing one or more polymers and one or more cured curable resin precursors, and having a phase-separated structure and an arithmetic mean roughness Ra of the surface of 30 nm or less is used on an electrode substrate of a resistive touch screen, the occurrence of a Newton's ring on the resistive touch screen can be effectively suppressed, and glaring can be suppressed even in high-definition LCD and organic EL displays, and thus the present invention was completed.

Namely, the present invention provides an anti-Newton ring film including an anti-Newton ring layer containing one or a plurality of polymers and one or a plurality of cured curable resin precursors, wherein the anti-Newton ring layer has a phase-separated structure, and an arithmetic mean roughness Ra of a surface of the anti-Newton ring layer is 30 nm or less. The anti-Newton ring film of the present invention may have a parallel light transmittance of 90% or higher. The anti-Newton ring film of the present invention may have a haze of 3% or less. The anti-Newton ring film of the present invention may have a transmission image clarity of 90% or higher as measured with an image clarity meter using an optical comb with a width of 0.5 mm. The anti-Newton ring layer may contain the polymer and the curable resin precursor at a ratio from 1/99 to 60/40 (weight ratio). The plurality of polymers include a (meth)acrylate-based resin having a polymerizable group, and cellulose esters, and a weight ratio of the (meth)acrylate-based resin having a polymerizable group to the cellulose esters ([the (meth)acrylate-based resin having a polymerizable group]/[the cellulose esters]) may be around from 80/20 to 99/1. The curable resin precursor may include a polyfunctional curable compound having three or more (meth)acryloyl groups, and a fluorine-containing curable compound. A ratio of the fluorine-containing curable compound in the anti-Newton ring layer is approximately from 0.05 to 1.5 wt. %. The anti-Newton ring film of the present invention preferably does not contain particles. The anti-Newton ring film of the present invention may include the anti-Newton ring layer and a transparent support. The anti-Newton ring layer may be formed on the transparent support.

The present invention also includes a method of manufacturing the anti-Newton ring film, wherein a liquid phase containing one or a plurality of polymers, one or a plurality of curable resin precursors, and a solvent is subjected to phase separation through spinodal decomposition in association with evaporation of the solvent to form a phase-separated structure, and the curable resin precursor is cured to form an anti-Newton ring layer.

The present invention also includes an electrode substrate for a resistive touch screen, the electrode substrate including the anti-Newton ring film, and a transparent conductive layer on the anti-Newton ring layer of the anti-Newton ring film. The present invention also includes a resistive touch screen provided with the electrode substrate.

The present invention also includes a method of preventing the occurrence of a Newton's ring in a resistive touch screen using the anti-Newton ring film.

Advantageous Effects of Invention

With the present invention, when an anti-Newton ring layer containing one or more polymers and one or more cured curable resin precursors, and having a phase-separated structure and an arithmetic mean roughness Ra of the surface of 30 nm or less is used on an electrode substrate of a resistive touch screen, the occurrence of a Newton's ring on the resistive touch screen can be effectively suppressed, and glaring can be suppressed even in high-definition LCD and organic EL displays (high-definition devices). Furthermore, with a resistive touch screen in which the anti-Newton ring layer does not contain particles, durability can also be improved without reducing the Newton ring preventing effect even with repeated use.

DESCRIPTION OF EMBODIMENTS

[Anti-Newton Ring Film]

Figure 1:
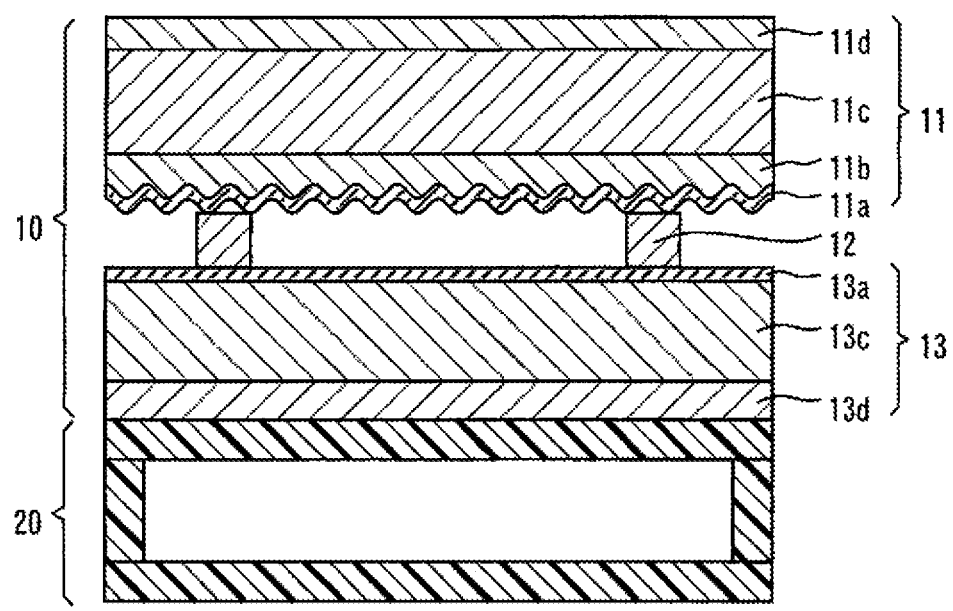
FIG. 1 is a schematic cross-sectional view illustrating an example of a touch screen according to an embodiment the present invention.

An anti-Newton ring film (anti-Newton ring film) is configured with at least an anti-Newton ring layer. A phase-separated structure of the anti-Newton ring layer may be formed through spinodal decomposition (wet spinodal decomposition) from a liquid phase. Namely, a phase-separated structure having a comparatively regular phase to phase distance can be formed by phase separation through spinodal decomposition as the concentration increases in a process of evaporating or removing a solvent through drying, etc. from a liquid phase (or a homogeneous solution or a coated layer thereof) of a resin composition constituted with one or a plurality of polymers, one or a plurality of curable resin precursors, and the solvent. More specifically, the wet spinodal decomposition is typically performed by coating a support with a mixed liquid or resin composition (homogeneous solution) containing one or a plurality of polymers, one or a plurality of curable resin precursors, and a solvent, and then vaporizing the solvent from the formed coating layer. When a peelable support is used as the support, an anti-Newton ring film configured with only an anti-Newton ring layer can be formed by curing the coating layer and peeling the cured coating layer from the support. Furthermore, when a non-peelable support (preferably a transparent support) is used as the support, an anti-Newton ring film with a layered structure configured from the support and the anti-Newton ring layer can be formed.

(Polymer)

As the polymer, a thermoplastic resin is typically used. Examples of the thermoplastic resin include styrene-based resins, (meth)acrylate-based resins, organic acid vinyl ester-based resins, vinyl ether-based resins, halogen-containing resins, olefin-based resins (including alicyclic olefin-based resins), polycarbonates, polyester, polyamides, thermoplastic polyurethane resins, polysulfone-based resins (such as polyether sulfone and polysulfone), polyphenylene ether-based resins (such as a polymer of 2,6-xylenol), cellulose derivatives (such as cellulose esters, cellulose carbamates, and cellulose ethers), silicone resins (such as polydimethylsiloxane and polymethylphenylsiloxane), and rubbers or elastomers (diene rubbers such as polybutadiene and polyisoprene; styrene-butadiene copolymers; acrylonitrile-butadiene copolymers; acrylic rubbers; urethane rubbers; and silicone rubbers). These thermoplastic resins may be the thermoplastic resins described in JP 2011-2820 A (Patent Document 1). These thermoplastic resins can be used alone or in a combination of two or more.

Of these thermoplastic resins, resins that are non-crystalline and soluble in an organic solvent (in particular, a common solvent capable of dissolving a plurality of polymers and/or curable compounds described below) are used. In particular, resins having high moldability or film forming properties, transparency, and weather resistance, such as styrene-based resins, (meth)acrylate-based resins, alicyclic olefin-based resins, polyester-based resins, and cellulose derivatives (such as cellulose esters) are preferable, and (meth)acrylate-based resins and cellulose esters are particularly preferable.

As the (meth)acrylate-based resin, a homopolymer or a copolymer of a (meth)acrylate-based monomer, or a copolymer of a (meth)acrylate-based monomer and a copolymerizable monomer can be used. Examples of the (meth)acrylic-based monomer include: (meth)acrylic acid; $C_{1-10}$ alkyl (meth)acrylates such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate, and 2-ethylhexyl (meth)acrylate; cycloalkyl (meth)acrylates such as cyclohexyl (meth)acrylate; aryl (meth)acrylates such as phenyl (meth)acrylate; hydroxyalkyl (meth)acrylates such as hydroxyethyl (meth)acrylate and hydroxypropyl (meth)acrylate; glycidyl (meth)acrylate; N,N-dialkylaminoalkyl (meth)acrylates such as N,N-dimethylaminoethyl (meth)acrylate; (meth)acrylonitrile; and (meth)acrylates having a bridged cyclic hydrocarbon group such as isobornyl (meth)acrylate, tricyclodecyl (meth)acrylate, and adamantyl (meth)acrylate. Examples of the copolymerizable monomer include styrene-based monomers, vinyl ester-based monomers, maleic anhydride, maleic acid, and fumaric acid. These monomers can be used alone or in a combination of two or more.

Examples of the (meth)acrylate-based resin include poly (meth)acrylates such as polymethylmethacrylate; a methyl methacrylate-(meth)acrylic acid copolymer, a methyl methacrylate-(meth)acrylate copolymer, a methyl methacrylate-acrylate-(meth)acrylic acid copolymer, a (meth)acrylate-styrene copolymer (such as MS resin), and a (meth)acrylic acid-methyl (meth)acrylate-isobornyl (meth)acrylate copolymer. Preferable (meth)acrylate-based resins include poly $C_{1-6}$ alkyl(meth)acrylates such as polymethyl(meth)acrylate, and in particular, a methyl methacrylate-based polymer having methyl methacrylate as a main component (from about 50 to 100 wt. % and preferably from about 70 to 100 wt. %) is preferred. Furthermore, the (meth)acrylate-based resin may be a silicone-containing (meth)acrylate-based resin.

Examples of the cellulose esters include aliphatic organic acid esters (cellulose acetates such as cellulose diacetate and cellulose triacetate; and $C_{1-6}$ acylates (preferably, $C_{2-6}$ acylates) such as cellulose propionate, cellulose butyrate, cellulose acetate propionate, and cellulose acetate butyrate), aromatic organic acid esters ($C_{7-12}$ aromatic carboxylates such as cellulose phthalate and cellulose benzoate), and inorganic acid esters (such as, for example, cellulose phosphate and cellulose sulfate). The cellulose esters may be mixed acid esters such as acetic acid-nitric acid cellulose esters. These cellulose esters can be used alone or in a combination of two or more. Among these cellulose esters, cellulose $C_{2-4}$ acylates such as cellulose diacetate, cellulose triacetate, cellulose acetate propionate, and cellulose acetate butyrate are preferred, and cellulose acetate $C_{3-4}$ acylates such as cellulose acetate propionate are particularly preferred.

As the polymer (particularly, a (meth)acrylate-based resin), a polymer having a functional group involved in a curing reaction (or a functional group that can be reacted with a below-described curable compound) can also be used. The polymer may have a functional group in the main chain or side chain. The functional group may be introduced into the main chain of the polymer by copolymerization or co-condensation, etc. of the monomers, but is usually introduced into a side chain. Examples of such functional groups include condensable groups, reactive groups (such as, for example, a hydroxyl group, an acid anhydride group, a carboxyl group, an amino group or an imino group, an epoxy group, a glycidyl group, or an isocyanate group), and polymerizable groups (such as, for example, $C_{2-6}$ alkenyl groups such as a vinyl group, a propenyl group, an isopropenyl group, a butenyl group, and an allyl group; $C_{2-6}$ alkynyl groups such as an ethynyl group, a propynyl group, and a butynyl group; $C_{2-6}$ alkenylidene groups such as a vinylidene group; or a group having a polymerizable group thereof (such as a (meth)acryloyl group)). Among these functional groups, polymerizable groups are preferred.

Examples of the method of introducing a polymerizable group into a side chain include a method in which a thermoplastic resin having a functional group such as a reactive group or a condensable group is reacted with a polymerizable compound having a group that is reactive with the functional group. For the thermoplastic resin having the functional group, examples of the functional group include a carboxyl group or an acid anhydride group thereof, a hydroxyl group, an amino group, and an epoxy group.

When a polymerizable compound is reacted with a thermoplastic resin having a carboxyl group or an acid anhydride thereof, examples of the polymerizable compound include those having an epoxy group or a hydroxyl group, an amino group, or an isocyanate group, etc. Among those, a polymerizable compound having an epoxy group is widely used, examples thereof including epoxycyclo $C_{5-8}$ alkenyl (meth)acrylates such as epoxycyclohexenyl (meth)acrylate; glycidyl (meth)acrylates, and allylglycidyl ethers.

Representative examples include a combination of a thermoplastic resin having a carboxyl group or an acid anhydride group thereof and a compound containing an epoxy group, and more particularly, a combination of a (meth)acrylate-based resin (such as a (meth)acrylic acid-(meth)acrylate copolymer) and an epoxy group-containing (meth)acrylate (such as epoxycycloalkenyl (meth)acrylate, and glycidyl (meth)acrylate). More specifically, a polymer in which a polymerizable unsaturated group is introduced into some of the carboxyl groups of a (meth)acrylate-based resin can be used, and examples thereof include a (meth)acrylic-based polymer (product of the trade name "Cyclomer-P" available from Daicel Corporation) in which a photopolymerizable unsaturated group is introduced into a side chain by reacting an epoxy group of 3,4-epoxycyclohexenylmethyl acrylate with some of the carboxyl groups of a (meth)acrylic acid-(meth)acrylate copolymer.

The amount of the functional group (in particular, the polymerizable group) involved in the curing reaction for thermoplastic resin introduced into the thermoplastic resin is from about 0.001 to 10 moles, preferably from about 0.01 to 5 moles, and more preferably from about 0.02 to 3 moles with respect to 1 kg of the thermoplastic resin.

These polymers can be used in combination as appropriate. That is, the polymer may be composed of a plurality of polymers. The plurality of polymers may be phase separable through liquid phase spinodal decomposition. Also, the plurality of polymers may be mutually immiscible. When a plurality of polymers are combined, the combination of a first polymer and a second polymer is not particularly limited, and a plurality of polymers which are mutually immiscible near a processing temperature, for example, two mutually immiscible polymers, can be appropriately combined and used.

Note that the phase-separated structure produced by spinodal decomposition is finally cured by active light rays (such as ultraviolet rays or an electron beam), heat, or the like, and is fixed by forming a cured resin. Thus, when the anti-Newton ring film has a transparent support, damage to the transparent support when forming a transparent conductive layer such as ITO through sputtering or the like can be mitigated due to the presence of an anti-Newton ring layer formed from the cured resin. In particular, when the transparent support is a plastic such as polyethylene terephthalate, in addition to damage mitigation, it is also possible to suppress the separation of low molecular components such as oligomers by heat from the inside of the transparent support. Furthermore, the cured resin can impart scratch resistance to the anti-Newton ring layer, and damage to the surface structure can be suppressed and durability can be improved even when the touch screen is repeatedly operated.

Furthermore, from the perspective of scratch resistance after curing, at least one of the plurality of polymers, for example, at least one of the mutually immiscible polymers (in particular both polymers when a first polymer and a second polymer are combined), is preferably a polymer having, in a side chain, a functional group capable of reacting with the curable resin precursor.

Preferable combinations of the first polymer and the second polymer include combinations of a (meth)acrylate-based resin (in particular, a (meth)acrylate-based resin having a polymerizable group) with a cellulose derivative (particularly cellulose esters).

The ratio (weight ratio) between the first polymer and the second polymer (first polymer/second polymer) can be set to a range of from about 1/99 to 99/1, preferably from 5/95 to 95/5, and even more preferably from 10/90 to 90/10.

In the case of a combination of a (meth)acrylate-based resin having a polymerizable group with a cellulose ester, the ratio of both ([the (meth)acrylate-based resin having a polymerizable group]/[the cellulose ester]) is approximately from 80/20 to 99/1, preferably from 81/19 to 95/5, and more preferably from 81.5/18.5 to 90/10 (particularly, from 82/18 to 85/15). When the ratio of cellulose ester is too small, there is a risk that protrusions may not be formed by the below-described recessed and protruding structure suited for the anti-Newton ring film. Conversely, if the ratio is too large, there is a risk that the protrusions may become too large, light scattering may be intensified, visibility may be reduced due to an increase in haze, and glare may be generated with a high-definition device.

Note that as the polymer for forming the phase-separated structure, in addition to the two immiscible polymers described above, the thermoplastic resin or other polymer may be included.

The glass transition temperature of the polymer can be selected, for example, from an approximate range of from −100° C. to 250° C., preferably from −50° C. to 230° C., and more preferably from 0° C. to 200° C. (for example, approximately from 50° C. to 180° C.). From the viewpoint of surface hardness, the glass transition temperature is advantageously 50° C. or higher (for example, approximately from 70° C. to 200° C.), and preferably 100° C. or higher (for example, approximately from 100° C. to 170° C.). Note that the glass transition temperature can be measured using a differential scanning calorimeter, and for example, the glass transition temperature can be measured using a differential scanning calorimeter ("DSC6200", available from Seiki Instruments Inc.) at a heating rate of 10° C./minute under a nitrogen flow. The weight average molecular weight (GPC, calibrated with polystyrene) of the polymer can be selected, for example, from an approximate range of 1000000 or less, and preferably approximately from 1000 to 500000.

(Curable Resin Precursor)

The curable resin precursor is a compound having a functional group that undergoes a reaction through heat, active energy rays (such as ultraviolet rays or electron beams) and the like, and various curable compounds which undergo curing or crosslinking by heat, active energy rays or the like and can form a resin (in particular, a cured or crosslinked resin) can be used. Examples of the curable resin precursor include a thermosetting compound or a resin [low molecular weight compounds having an epoxy group, a polymerizable group, an isocyanate group, an alkoxysilyl group, or a silanol group, and the like (such as, for example, an epoxy-based resin, an unsaturated polyester-based resin, a urethane-based resin, and a silicone-based resin)], and a photocurable compound that can be cured by active rays (such as ultraviolet rays) (such as photocurable monomers, oligomers, and other such UV curable compounds), and the photocurable compound may be an electron beam (EB) curable compound. Note that the photocurable compound such as a photocurable monomer, a photocurable oligomer, and a photocurable resin that may have a low molecular weight may be simply referred to as a "photocurable resin".

Examples of the photocurable compound include a monomer and an oligomer (or resin, in particular, a low molecular weight resin). Monomers can be classified, for example, into monofunctional monomers having one polymerizable group and polyfunctional monomers having at least two polymerizable groups.

Examples of monofunctional monomers include (meth)acrylic-based monomers such as (meth)acrylates, vinyl-based monomers such as vinyl pyrrolidone, and (meth)acrylates having a bridged cyclic hydrocarbon group such as isobornyl (meth)acrylate and adamantyl (meth)acrylate.

The polyfunctional monomer includes polyfunctional monomers having around two to eight polymerizable groups. Examples of di-functional monomers include alkylene glycol di(meth)acrylates such as ethylene glycol di(meth)acrylate, propylene glycol di(meth)acrylate, butanediol di(meth)acrylate, neopentyl glycol di(meth)acrylate, and hexanediol di(meth)acrylate; (poly)oxyalkylene glycol di(meth)acrylates such as diethylene glycol di(meth)acrylate, dipropylene glycol di(meth)acrylate, and polyoxytetramethylene glycol di(meth)acrylate; and di(meth)acrylates having a bridged cyclic hydrocarbon group such as tricyclodecane dimethanol di(meth)acrylate and adamantane di(meth)acrylate.

Examples of tri-functional to octa-functional monomers include glycerin tri(meth)acrylate, trimethylolpropane tri(meth)acrylate, trimethylolethane tri(meth)acrylate, pentaerythritol tri(meth)acrylate, pentaerythritol tetra(meth)

acrylate, dipentaerythritol penta(meth)acrylate, and dipentaerythritol hexa(meth)acrylate.

Examples of the oligomer or the resin include (meth) acrylates of a bisphenol A-alkylene oxide adduct, epoxy (meth)acrylates (such as bisphenol A type-epoxy (meth) acrylate and novolac-type epoxy (meth)acrylate), polyester (meth)acrylates (such as, for example, aliphatic polyester-type (meth)acrylate and aromatic polyester-type (meth)acrylate), (poly)urethane (meth)acrylates (such as polyester-type urethane (meth)acrylate and polyether-type urethane (meth) acrylate), and silicone (meth)acrylate. These (meth)acrylate oligomers or resins may include a copolymerizable monomer exemplified in the section on (meth)acrylate-based resins for the polymer. These photocurable compounds can be used alone or in a combination of two or more.

Furthermore, the curable resin precursor may contain a fluorine atom or inorganic particles from the perspective of improving the strength of the anti-Newton ring layer. Examples of the precursor containing a fluorine atom (fluorine-containing curable compound) include fluorides of monomers and oligomers, for example, fluorinated alkyl (meth)acrylates (such as, for example, perfluorooctyl ethyl (meth)acrylate, and trifluoroethyl (meth)acrylate), fluorinated (poly)oxyalkylene glycol di(meth)acrylates (such as, for example, fluoroethylene glycol di(meth)acrylate and fluoropropylene glycol di(meth)acrylate), fluorine-containing epoxy resins, and fluorine-containing urethane-based resins. Examples of the precursor containing inorganic particles include inorganic particles having a polymerizable group on the surface (such as, for example, silica particles for which the surface has been modified by a silane coupling agent having a polymerizable group). As nano-sized silica particles having a polymerizable group on the surface, a polyfunctional hybrid-based UV curing agent (Z7501) is commercially available from JSR Corporation.

A preferable curable resin precursor is a photocurable compound that can be cured in a short time, including for example, an ultraviolet curable compound (such as a monomer, oligomer, or resin that may have a low molecular weight), and an EB curable compound. In particular, a curable resin precursor that is advantageous from a practical perspective is an ultraviolet curable compound. Furthermore, in order to improve durability for repeated use as a touch screen, the photocurable compound is preferably a bifunctional or higher (preferably bifunctional to deca-functional, and more preferably around tri-functional to octa-functional) photocurable compound, and is particularly preferably a photocurable compound that includes a polyfunctional (meth)acrylate, for example, a tri-functional or higher (in particular, a tetra-functional to octa-functional) (meth)acrylate.

Furthermore, in an embodiment of the present invention, the curable resin precursor may combine a penta-functional to hepta-functional (meth) acrylate with a tri-functional to tetra-functional (meth)acrylate. The ratio (weight ratio) of the two ([the penta-functional to hepta-functional (meth) acrylate]/[the tri-functional to tetra-functional (meth)acrylate]) is approximately, for example, from 100/0 to 30/70, preferably from 99/1 to 50/50, and more preferably from 90/10 to 60/40 (in particular, from 75/25 to 65/35).

Also, from the perspective of being able to reduce the surface tension, form a fine recessed and protruding structure on the surface of the anti-Newton ring layer, reduce the haze value, and also improve the strength of the anti-Newton ring layer, in addition to the polyfunctional (meth)acrylate (a polyfunctional curable compound having three or more (meth)acryloyl groups), the curable resin precursor preferably also includes the fluorine-containing curable compound (in particular, a monomer having a (meth)acryloyl group and a fluorine atom such as a (meth)acrylate containing a fluorinated alkyl chain). The ratio of the fluorine-containing curable compound in the anti-Newton ring layer is 0.01 wt. % or greater, and for example is around from 0.05 to 1.5 wt. %, preferably from 0.06 to 1 wt. %, and even more preferably from 0.07 to 0.5 wt. % (in particular, from 0.08 to 0.2 wt. %). If the ratio of the fluorine-containing curable compound is too low, formation of the fine recessed and protruding structure may be difficult.

In consideration of miscibility with the polymer, the number average molecular weight of the curable resin precursor is around 5000 or less, preferably 2000 or less, and more preferably 1000 or less. Note that the number average molecular weight can be measured by the film osmotic pressure method.

The curable resin precursor may contain a curing agent according to the type of the curable resin precursor. For example, a thermosetting resin may be combined with a curing agent such as amines and polyvalent carboxylic acids, and a photocurable resin may be combined with a photopolymerization initiator. Examples of the photopolymerization initiator include known components such as acetophenones or propiophenones, benzyls, benzoins, benzophenones, thioxanthones, and acylphosphine oxides. The content amount of the curing agent such as a photopolymerization initiator (photocuring agent) in the anti-Newton ring layer may be approximately from 0.1 to 20 wt. %, preferably from 0.5 to 10 wt. %, and more preferably from 1 to 8 wt. % (in particular, from 1 to 5 wt. %), and may be approximately from 1 to 2 wt. %.

Furthermore, the curable resin precursor may be combined with a curing accelerator. For example, a photocurable resin may be combined with a photocuring accelerator, such as, for example, tertiary amines (such as a dialkylaminobenzoate), or a phosphine-based photopolymerization accelerator.

(Combination of a Polymer and a Curable Resin Precursor)

The polymer and curable resin precursor are used in a combination in which at least two components of the at least one polymer and at least one curable resin precursor undergo phase separation from one another near the processing temperature. Examples of the combination that undergoes phase separation include (a) a combination in which a plurality of polymers are mutually immiscible and undergo phase separation, (b) a combination in which a polymer and a curable resin precursor are immiscible and undergo phase separation, and (c) a combination in which a plurality of curable resin precursors are mutually immiscible and undergo phase separation. Of these combinations, typically the combination (a) of a plurality of polymers, and the combination (b) of a polymer and a curable resin precursor are used, and the combination (a) of a plurality of polymers is preferable. In a case where both components, which are to be subjected to phase separation, are highly miscible, they do not effectively undergo phase separation in the drying process for evaporating the solvent, and the function as an anti-Newton ring layer may be impaired.

Note that the polymer and the curable resin precursor (or cured resin) may be mutually miscible or immiscible. When the polymer and the curable resin precursor are immiscible and undergo phase separation, a plurality of polymers may be used as the polymer. When a plurality of polymers are used, at least one of the polymers is required to be immiscible with the resin precursor (or cured resin), and the other polymers may be miscible with the resin precursor.

Also, the polymer and curable resin precursor may be a combination of two mutually immiscible polymers and a curable compound (in particular, a monomer or oligomer having a plurality of curable functional groups). Furthermore, from the perspective of scratch resistance after curing, one polymer (and particularly both polymers) of the immiscible polymers may be a polymer having a functional group that participates in the curing reaction (a functional group that participates in the curing of the curable resin precursor).

In the case where the polymer includes a plurality of mutually immiscible polymers and is subjected to phase separation, the combination includes a curable resin precursor that is miscible with at least one polymer of the plurality of immiscible polymers near the processing temperature. That is, when the plurality of mutually immiscible polymers is configured, for example, with a first polymer and a second polymer, the curable resin precursor need only be miscible with at least one of the first polymer and the second polymer, and preferably, may be miscible with both polymers. When the curable resin precursor is miscible with both polymers, a mixture including the first polymer and the curable resin precursor component as main components and a mixture including the second polymer and the curable resin precursor component as main components undergo phase separation into at least two phases.

Specifically, when the plurality of polymers is a combination of cellulose esters and a (meth)acrylate-based resin having a polymerizable group, and the curable resin precursor is a polyfunctional (meth)acrylate, the polymers are not only mutually immiscible and undergo phase separation, and also the combination of the (meth)acrylate-based resin having a polymerizable group and the polyfunctional (meth)acrylate may be immiscible and undergo phase separation, and the cellulose esters and the polyfunctional (meth)acrylate may be miscible.

In a case where the miscibility between the selected plurality of polymers and the curable resin precursor is high, the polymers themselves or the polymers and the precursor do not effectively undergo phase separation in the drying process for evaporating the solvent, and the function as an anti-Newton ring layer may be impaired. The degree of phase separation of the plurality of polymers and the precursor can be easily determined by preparing a homogeneous solution using a good solvent for both components, and visually confirming whether residual solids become cloudy during the process of gradual evaporation of the solvent.

The difference in refractive indexes between the polymer and the cured or crosslinked resin, and the difference in refractive indexes between the plurality of polymers (the first polymer and the second polymer) may each be, for example, from about 0.001 to 0.2, and preferably from about 0.05 to 0.15. Note that the refractive index can be measured at 25° C. and a wavelength of 633 nm using a prism coupler (available from Metricon Corporation).

In spinodal decomposition, a co-continuous phase structure is formed as the phase separation proceeds. As the phase separation further proceeds, the continuous phase becomes discontinuous due to surface tension thereof, and a droplet phase structure (sea-island structure of an independent phase having a shape such as spherical, perfectly spherical, disc-like, or ellipsoidal) is formed. Therefore, depending on the extent of phase separation, an intermediate structure between the co-continuous phase structure and the droplet phase structure (that is, a phase structure in a process of transitioning from the co-continuous phase to the droplet phase) can also be formed. The phase-separated structure of the anti-Newton ring layer may be a sea-island structure (droplet phase structure, or a phase structure where one phase is independent or isolated), or a co-continuous phase structure (or mesh structure), or may be an intermediate structure that is a mixture of the co-continuous phase structure and the droplet phase structure. Through these phase-separated structures, fine recesses and protrusions can be formed on the surface of the anti-Newton ring layer after solvent drying.

In the phase-separated structure, a droplet phase structure having at least an island-like domain is advantageous from the perspective of forming a surface of a recessed and protruding structure and increasing the surface hardness. Note that when the phase-separated structure constituted by the polymer and the precursor (or cured resin) is a sea-island structure, the polymer may form a sea phase, but from the perspective of surface hardness, the polymer preferably forms an island-like domain. Note that through the formation of the island-like domain, fine recesses and protrusions can be formed on the surface of the anti-Newton ring layer after drying. In an embodiment of the present invention, the recessed and protruding structure is formed by the phase separated components, and therefore, compared to a case where a recessed and protruding structure is formed by containing hard microparticles or the like, the recessed and protruding structure of the surface is a structure having a smooth shape, and detachment of the protrusions can be suppressed. Accordingly, the anti-Newton ring layer excels in keystroke durability, which is important for a resistive touch screen, and can suppress cracking and damage of a transparent conductive layer even with repeated keystrokes (for example, even with several hundred thousand keystrokes or more) on an electrode substrate that is provided with an anti-Newton ring layer and a transparent conductive layer formed of a metal oxide such as ITO.

Further, the distance between domains of the phase-separated structure may be irregular, but is typically substantially regular or periodic. For example, an average distance between domains (average distance between phases) may be approximately, for example, from 1 to 70 μm (for example, from 1 to 40 μm), preferably from 2 to 50 μm (for example, from 3 to 30 μm), and more preferably from 5 to 20 μm (particularly, from 10 to 20 μm). Note that the average distance between domains (average distance between phases) can be measured through observation with a transmission electron microscopy image.

From the perspective of forming a recessed and protruding structure, the ratio of the polymer is preferably 60 wt. % or less relative to the total amount of the polymer and the curable resin precursor. More specifically, the ratio (weight ratio) of the polymer to the curable resin precursor is approximately, for example, from 1/99 to 60/40, and preferably from 2/98 to 50/50 (for example, from 5/95 to 40/60), and from the perspective of being able to suppress blocking when winding the anti-Newton ring film on a roll, the ratio thereof is more preferably approximately from 10/90 to 35/65 (particularly, from 15/85 to 25/75). In a case where the ratio of the polymer is too high, the protrusions of the recessed and protruding structure become too large, and as a result, there is a risk that glaring may become noticeable, it may readily become turbid due to an increase in haze, and in addition, the mechanical strength may be impaired due to a decrease in the ratio of the curable resin precursor.

The thickness (average thickness) of the anti-Newton ring layer may be approximately, for example, from 0.3 to 20 μm, and preferably from 1 to 15 μm (for example, from 1 to 10 μm), and is typically from about 2 to 10 μm (particularly, from 3 to 7 μm). Note that when the anti-Newton ring film is constituted by the anti-Newton ring layer alone, the thickness (average thickness) of the anti-Newton ring layer may be selected from a range of, for example, from about 1 to 100 μm, and preferably from about 3 to 50 μm.

As described above, the anti-Newton ring film may be configured with an anti-Newton ring layer alone, or may be configured with a support and an anti-Newton ring layer formed on the support. As the support, a support having light transmittance, for example a transparent support such as a synthetic resin film, is used. Furthermore, the optically transparent support may be constituted by a transparent polymer film that is used in an optical member.

(Transparent Support)

Examples of the transparent support (or base material sheet) include glass, ceramic, and resin sheets. A resin similar to that of the anti-Newton ring layer can be used as the resin constituting the transparent support. Preferred transparent supports include transparent polymer films. Examples of the resin constituting the transparent polymer film include cellulose derivatives [cellulose acetates such as cellulose triacetate (TAC), and cellulose diacetate, and the like], polyester-based resins [such as polyethylene terephthalate (PET), polybutylene terephthalate (PBT), and polyarylate-based resins], polysulfone-based resins [such as polysulfone and polyethersulfone], polyetherketone-based resins [such as polyetherketone and polyetheretherketone], polycarbonate-based resins (such as bisphenol A type polycarbonate), polyolefin-based resins (such as polyethylene and polypropylene), cyclic polyolefin-based resins [resins that are commercially available under trade names such as "TOPAS", "ARTON", and "ZEONEX"], halogen-containing resins (such as polyvinylidene chloride), (meth)acrylate-based resins, styrene-based resins (such as polystyrene), and vinyl acetate or vinyl alcohol-based resins (such as polyvinyl alcohol). The transparent support may be uniaxially or biaxially stretched.

Examples of optically isotropic transparent supports include glass and unstretched or stretched plastic sheets or films. Examples of the resin constituting such a sheet or film include polyester-based resins (such as PET and PBT), and cellulose esters (cellulose acetates such as cellulose diacetate and cellulose triacetate; and cellulose acetate $C_{3-4}$ acylates such as cellulose acetate propionate and cellulose acetate butyrate), and particularly polyester-based resins such as PET. When the anti-Newton ring film is used on an upper electrode substrate (electrode substrate that is provided on the side on which a pressing member such as a finger or pen is to make a contact), flexibility is required, and therefore of these supports, a plastic sheet or film (unstretched or stretched plastic sheet or film) can be used.

The transparent support typically has a two-dimensional structure. The average thickness of the support having a two-dimensional structure is, for example, from about 5 to 2000 μm, preferably from about 15 to 1000 μm, and more preferably from about 20 to 500 μm.

(Properties of the Anti-Newton Ring Film)

The anti-Newton ring film according to an embodiment of the present invention has a fine recessed and protruding structure formed on the surface, the structure corresponding to the phase-separated structure. Therefore, the anti-Newton ring film can effectively prevent or suppress the occurrence of a Newton's ring on a touch screen (particularly, a resistive film touch screen). Furthermore, the anti-Newton ring film exhibits high clarity of a transmission image, and therefore a vivid image with suppressed glare can be displayed by a display unit of a display device, and contrast can be improved even in a high-definition device.

Further, as described above, in the phase-separated structure, the average distance between domains (average distance between phases) is substantially regular or periodic. Thus, due to Bragg reflection corresponding to the average distance between phases (or periodicity of the recessed and protruding structure of the surface), light that is incident on and transmitted through the anti-Newton ring film exhibits a scattered light maximum at a specific angle separated from linearly transmitted light. Therefore, the scattered light due to the surface recesses and protrusions does not adversely affect the profile of linearly transmitted light, and unlike the typical microparticle-dispersed type anti-Newton ring layer, not only are a Newton's ring suppressed, but glare from the image of the display device can also be resolved.

The anti-Newton ring film according to an embodiment of the present invention excels in a low glare property, and the standard deviation (glare value) of the luminance distribution measured on an organic EL display is 7.5 or less, and for example, is approximately from 4.1 to 7, preferably from 4.3 to 6.5, and even more preferably from 4.5 to 6 (particularly from 4.8 to 5.5). Note that in the present specification and claims, the standard deviation of the luminance distribution can be measured by the method described in the Examples below.

The anti-Newton ring layer of the anti-Newton ring film according to an embodiment of the present invention has a fine recessed and protruding structure, and specifically, the arithmetic mean roughness Ra of the surface is around 30 nm or less (for example, from 1 to 30 nm), preferably from around 2 to 25 nm (for example, from 3 to 20 nm), and more preferably from around 5 to 15 nm (particularly, from 8 to 12 nm). In a case where the arithmetic mean roughness Ra is too large, light scattering may be too strong, and the low glare property in high-definition devices may decrease.

In the present specification and claims, the arithmetic mean roughness Ra can be measured using a contact type surface roughness meter ("Surfcom 570A" available from Tokyo Seimitsu Co., Ltd.) in accordance with JIS B0601.

The total light transmittance of the anti-Newton ring film according to an embodiment of the present invention may be 90% or greater, and for example, may be approximately from 90% to 100%, preferably from 90.5% to 98%, and more preferably from 91% to 95% (in particular, from 91% to 93%). When the total light transmittance is too low, contrast at the viewing portion of an image display device may be reduced.

The haze of the anti-Newton ring film according to an embodiment of the present invention may be 3% or less, and for example may be around from 0.1% to 3% (for example, from 0.3% to 3%), preferably from 0.4% to 2.5% (for example, from 0.5% to 2%), and more preferably from 0.8% to 1.8% (particularly, from 1% to 1.5%). In the present invention, an anti-Newton ring property and a low glare property in a high-definition device can both be achieved by ensuring a low haze value such as this. In a case where the haze is too large, there is a possibility that the low glare property of a high-definition device may be impaired.

In the present specification and claims, haze and total light transmittance can be measured according to JIS K7136 using a haze meter ("NDH-5000W" available from Nippon Denshoku Industries Co., Ltd.).

When measured using an optical comb with a width of 0.5 mm, the transmission image clarity of the anti-Newton ring film according to an embodiment of the present invention may be 90% or greater, and for example, may be approximately from 90% to 100%, preferably from 92% to 99%, and more preferably from about 93% to 98% (particularly from 94% to 97%), for example. When the transmission image clarity is within the range described above, scattering of linearly transmitted light is low, and therefore even in a case where the touch screen is disposed on a high-definition device, scattering from each pixel is small, glare can be prevented, and contrast can be improved. When the transmission image clarity is too low, the low glare property in a high-definition device may be impaired.

Transmission image clarity is a scale for quantifying blur and distortion of light transmitted through a film. Transmission image clarity is determined by measuring light transmitted through a film through a moving optical comb and calculating the value from the amount of light in the light and dark portions of the optical comb. In other words, when light is blurred by a film, the slit image formed on the optical comb is thicker. Thus, the amount of light in the transmitting portion is 100% or less, and the amount of light in the non-transmitting portion is 0% or greater due to leakage of light. A value C for transmission image clarity is defined by the following formula from a maximum value M of transmitted light of a transparent portion of the optical comb and a minimum value m of transmitted light of a non-transparent portion of the optical comb.

$$C(\%)=[(M-m)/(M+m)]\times 100$$

In other words, values of C closer to 100% mean less blurring of the image by the anti-Newton ring film (reference document: Suga and Mitamura, Coating Technology, July 1985 edition).

(Method of Manufacturing Anti-Newton Ring Film)

The anti-Newton ring film according to an embodiment of the present invention can be obtained through: performing phase separation of a liquid phase (or liquid composition) containing the polymer, a curable resin precursor, and a solvent, by spinodal decomposition associated with the evaporation of the solvent to form a phase-separated structure (phase separating); and curing the curable resin precursor to form at least an anti-Newton ring layer (curing).

The performing phase separation generally includes applying or casting onto the support a mixed liquid (especially a liquid composition such as a homogeneous solution) containing the polymer, the curable resin precursor, and the solvent; and evaporating the solvent from the coating layer or the casting layer to form a phase-separated structure having a regular or periodic average distance between phases; and an anti-Newton ring film can be obtained by curing the precursor. In a preferred aspect, a composition containing the thermoplastic resin, a photocurable compound, a photopolymerization initiator, and a solvent in which the thermoplastic resin and the photocurable compound can be dissolved, can be used as the mixed liquid, and an anti-Newton ring layer is formed by curing, through irradiation with light, the photocurable component of the phase-separated structure formed by spinodal decomposition. In another preferred aspect, a composition containing a plurality of mutually immiscible polymers, a photocurable compound, a photopolymerization initiator, and a solvent, can be used as the mixed liquid, and an anti-Newton ring layer is formed by curing, through irradiation with light, the photocurable component of the phase-separated structure formed by spinodal decomposition.

In wet spinodal decomposition, the solvent can be selected according to the type and solubility of the polymer and the curable resin precursor, and need only be a solvent that can homogeneously dissolve the solid content (the plurality of polymers and the curable resin precursor, a reaction initiator, and other additives). Examples of such solvents include ketones (such as acetone, methyl ethyl ketone, methyl isobutyl ketone, and cyclohexanone), ethers (such as dioxane and tetrahydrofuran), aliphatic hydrocarbons (such as hexane), alicyclic hydrocarbons (such as cyclohexane), aromatic hydrocarbons (such as toluene and xylene), halogenated carbons (such as dichloromethane and dichloroethane), esters (such as methyl acetate, ethyl acetate, and butyl acetate), water, alcohols (such as ethanol, isopropanol, butanol, cyclohexanol, and 1-methoxy-2-propanol), cellosolves (such as methyl cellosolve, ethyl cellosolve, and propylene glycol monomethyl ether), cellosolve acetates, sulfoxides (such as dimethyl sulfoxide), and amides (such as dimethylformamide and dimethylacetamide). In addition, the solvent may be a mixed solvent.

Among these solvents, ketones such as methyl ethyl ketone are preferable, and a mixed solvent of ketones with alcohols (such as butanol) and/or cellosolves (such as 1-methoxy-2-propanol) is particularly preferable. In such a mixed solvent, the ratio of alcohols and/or cellosolves (the total amount when both are included) is approximately from 10 to 100 parts by weight, preferably from 30 to 80 parts by weight, and more preferably from 40 to 60 parts by weight per 100 parts by weight of the ketones. When such a mixed solvent contains alcohols and cellosolves, the ratio of the cellosolves per 100 parts by weight of the alcohols is approximately, for example, from 1 to 100 parts by weight, preferably from 10 to 90 parts by weight, and more preferably from 30 to 80 parts by weight. In an embodiment of the present invention, the phase separation through spinodal decomposition can be adjusted by appropriately combining the solvents, and thereby fine recessed and protruding shapes can be formed.

The concentration of solutes (the polymer and curable resin precursor, a reaction initiator, and other additives) in the mixed liquid can be selected within a range in which phase separation occurs and within a range in which casting properties and coating properties are not impaired, and the concentration thereof is approximately, for example, from 1 to 80 wt. %, preferably from 5 to 60 wt. %, and more preferably from 15 to 50 wt. % (in particular, from 20 to 50 wt. %). If the ratio of the solutes is too high, phase separation becomes pronounced, and the haze increases due to the increased amount of protrusions and stronger scattering, and therefore glaring may occur. Conversely, if the ratio is too low, there is a concern that protrusions suitable for the anti-Newton ring layer cannot be formed through phase separation.

When a mixed liquid or coating solution is applied to the transparent support, a solvent that does not dissolve, erode or cause swelling of the transparent support may be selected according to the type of the transparent support. For example, for a case in which a polyester film is used as a transparent support, when tetrahydrofuran, methyl ethyl ketone, isopropanol, 1-butanol, 1-methoxy-2-propanol, toluene, or the like is used as the solvent of the mixed liquid or coating solution, the anti-Newton ring layer can be formed without impairing the properties of the film.

Examples of the application method include known methods such as a roll coater, an air knife coater, a blade coater, a rod coater, a reverse coater, a bar coater, a comma coater, a dip squeeze coater, a die coater, a gravure coater, a micro gravure coater, a silk screen coater method, a dip method, a spray method, and a spinner method. Among these methods, the bar coater method or the gravure coater method are widely used. If necessary, the coating solution may be applied a plurality of times.

After the mixed liquid has been casted or applied, the phase separation through spinodal decomposition can be induced by evaporating the solvent at a temperature lower than the boiling point of the solvent (for example, temperature that is lower than the boiling point of the solvent by about 1 to 120° C., preferably by about 5 to 50° C., and particularly preferably by about 10 to 50° C.). The solvent is ordinarily evaporated by drying, and for example, can be evaporated by drying at a temperature of approximately from 30 to 200° C. (for example, from 30 to 100° C.), preferably about from 40 to 120° C., and more preferably about from 60 to 100° C. (particularly, from 70 to 90° C.) depending on the boiling point of the solvent.

Through such spinodal decomposition accompanied by the evaporation of the solvent, regularity or periodicity can be imparted to the average distance between domains of the phase-separated structure. The phase-separated structure formed by spinodal decomposition can be immediately fixed by curing the precursor in the curing. The precursor can be cured through heating, irradiation with light, or a combination of these methods in accordance with the type of the curable resin precursor. The heating temperature can be selected from a suitable range, for example, from about 50 to 150° C., as long as the cured product has the phase-separated structure, and may be selected from the same temperature range as that used in phase separation.

The light irradiation can be selected according to the type of the photocuring component or the like, and usually, ultraviolet rays, electron beams, and the like can be used. A general-purpose exposure source is usually an ultraviolet irradiation device.

Examples of the light source include a deep UV lamp, a low-pressure mercury lamp, a high-pressure mercury lamp, an ultrahigh-pressure mercury lamp, a halogen lamp, and a laser light source (light source such as a helium-cadmium laser and an excimer laser) in the case of the ultraviolet rays. The amount of irradiation light (irradiation energy) varies depending on the thickness of the coating film, and is, for example, from about 10 to 10000 $mJ/cm^2$, preferably from about 20 to 5000 $mJ/cm^2$, and more preferably from about 30 to 3000 $mJ/cm^2$. If necessary, the light irradiation may be performed in an inert gas atmosphere.

Electrode Substrate

The electrode substrate according to an embodiment of the present invention is an electrode substrate of a touch screen (particularly, a resistive touch screen), and a transparent conductive layer is formed on the anti-Newton ring layer of the anti-Newton ring film.

The transparent conductive layer is configured of a commonly used transparent conductive layer that is used as a transparent electrode, for example, a metal oxide such as an indium-oxide-tin oxide-based composite oxide (ITO), a fluorine-doped tin oxide (FTO), $InO_2$, $SnO_2$, or $ZnO$, or a metal such as gold, silver, platinum, or palladium (in particular, a metal oxide layer such as an ITO film). Such a transparent conductive layer can be formed by a commonly used method, such as sputtering, vapor deposition, and chemical vapor deposition (typically sputtering). The thickness (average thickness) of the transparent conductive layer is, for example, from about 0.01 to 0.05 µm, preferably from about 0.015 to 0.03 µm, and more preferably from about 0.015 to 0.025 µm. In an embodiment of the present invention, the transparent conductive layer having a uniform, regular recessed and protruding structure can be obtained by forming the transparent conductive layer on the surface having the recessed and protruding structure of the anti-Newton ring layer. Thus, the occurrence of Newton rings due to interference of interfacial reflected light between the transparent conductive layer and the air layer contained between the transparent conductive layers of both electrodes can be suppressed. Furthermore, because such a recessed and protruding structure is formed by phase separation, the transparent conductive layer has a smooth and regular structure of recesses and protrusions, and excels in keystroke durability even if the transparent conductive layer is formed of a metal oxide such as ITO.

The formation of transparent conductive layer on the anti-Newton ring layer depends on the type of the touch screen, and the transparent conductive layer is formed in a planar shape for an analog type, and in a stripe shape for a digital type. Examples of the method of forming the transparent conductive layer into a planar or stripe shape include a method in which a transparent conductive layer is formed on an entire surface of the anti-Newton ring layer, and then patterned into a planar or stripe shape by etching, and a method of forming the transparent conductive layer in a patterned shape in advance.

In the electrode substrate according to an embodiment of the present invention, a hard coat layer may be formed on a surface opposite the surface on which the transparent conductive layer is formed. As the hard coat layer, a commonly used transparent resin layer can be used, including, for example, a hard coat layer formed of a photocurable compound exemplified in the section on the curable resin precursor, an anti-glare hard coat layer containing inorganic or organic microparticles in a transparent resin, or an anti-glare hard coat layer obtained by performing phase separation a transparent resin in the same manner as the anti-Newton ring layer. The thickness (average thickness) of the hard coat layer is, for example, from about 0.5 to 30 µm, preferably from about 1 to 20 µm, and more preferably from about 2 to 15 µm.

The electrode substrate according to an embodiment of the present invention may be further combined with other optical elements (for example, various optical elements disposed in an optical path such as a polarizing plate, a retardation plate, and a light guide plate, etc.). That is, the electrode substrate may be disposed or laminated on at least one optical path surface of an optical element. For example, an electrode substrate may be laminated on at least one side of the retardation plate, or the electrode substrate may be disposed or laminated on the emitting surface of the light guide plate. An electrode substrate combined with a polarizing plate or a phase difference film can be suitably used in an inner-type touch screen having an anti-reflecting function.

[Touch Screen]

A touch screen (particularly a resistive touch screen) according to an embodiment of the present invention includes the electrode substrate. FIG. 1 is a schematic cross-sectional view illustrating an example of a touch screen according to an embodiment the present invention. In a touch screen 10, an upper electrode substrate 11 and a lower electrode substrate 13 are laminated with spacers 12 interposed therebetween, and a transparent conductive layer 11a of the upper electrode substrate 11 and a transparent conductive layer 13a of the lower electrode substrate 13 are facing each other, and the touch screen 10 is disposed on a liquid crystal panel 20.

In the upper electrode substrate 11, a hard coat layer 11d is formed on one surface (panel front side or upper surface)

of a transparent substrate 11c that is configured by a transparent plastic film, and an anti-Newton ring layer 11b is formed on the other surface (panel back side or lower surface) of the transparent substrate 11c. The transparent conductive layer 11a is formed on the surface of the anti-Newton ring layer 11b (the panel back side or lower surface), and the surface of the anti-Newton ring layer 11b has a uniform and regular recessed and protruding structure, and therefore the surface of the transparent conductive layer 11a also has a recessed and protruding structure that conforms the recessed and protruding structure of the anti-Newton ring layer 11b. A user presses the upper electrode substrate 11 using a pressing member such as a finger or a pen, causing the transparent conductive layer 11a to bend and make a contact with the transparent conductive layer 13a of the lower electrode substrate 13, thereby allowing conduction to occur, and the position is detected. In an embodiment of the present invention, the surface of the transparent conductive layer 11a of the upper electrode substrate 11 has a uniform recessed and protruding structure that conforms the surface shape of the anti-Newton ring layer 11b, and therefore when the user presses the upper electrode substrate 11, the occurrence of Newton rings due to interference of interfacial reflected light between the upper electrode substrate 11 and a space (air layer) formed by the spacers 12 can be suppressed.

The spacer 12 is configured from a transparent resin and is formed in a point or dot shape patterned on the surfaces of the transparent conductive layers 11a and 13a in order to maintain the upper electrode substrate 11 and the lower electrode substrate 13 not in contact with each other when the touch screen is not pressed. Such a spacer 12 is typically formed through patterning using a photocurable compound exemplified in the section on the curable resin precursor, and using a mask for light irradiation. The formation of spacers is not required, but if spacers are formed, the interval between adjacent spacers may be adjusted, for example, from approximately 0.1 to 20 mm (in particular, from 1 to 10 mm). The shape of the spacer is not particularly limited, and may be a cylindrical shape, a quadrangular prism shape, a spherical shape, or the like. The height of the spacer is, for example, approximately from 1 to 100 μm, and is ordinarily approximately from 3 to 50 μm (in particular, from 5 to 20 μm). The average diameter of the spacer is approximately, for example, from 1 to 100 μm, and ordinarily, is approximately from 10 to 80 μm (in particular, from 20 to 50 μm).

The lower electrode substrate 13 is disposed below the upper electrode substrate 11 with the spacers 12 interposed therebetween, the transparent conductive layer 13a is formed on one surface (panel front side or upper surface) of the transparent substrate 13c configured from glass, and a hard coat layer 13d is formed on the other surface (panel back side or lower side) of the transparent substrate 13c. In the example of FIG. 1, the surface of the transparent conductive layer 13a of the lower electrode substrate 13 is smooth, but similar to the upper electrode substrate 11, an anti-Newton ring layer may be formed, and a recessed and protruding structure may be formed on the surface. The anti-Newton ring effect can be improved by forming an anti-Newton ring layer on both the upper electrode substrate 11 and the lower electrode substrate 13. Alternatively, an anti-Newton ring layer may be formed on the lower electrode substrate 13 without forming a recessed and protruding structure on the upper electrode substrate 11. From the perspective of achieving both an anti-Newton ring effect and visibility of a display device disposed below the touch screen, it is preferable to form an anti-Newton ring layer on one electrode substrate (in particular, the upper electrode substrate). Unlike the transparent substrate 11c of the upper electrode substrate, the transparent substrate 13c does not require flexibility and therefore may be a non-flexible material such as a glass substrate. However, the transparent substrate 13c may be a transparent plastic film having flexibility similar to that of the transparent substrate 11c.

The touch screen 10 including such upper and lower electrode substrates is disposed on a liquid crystal panel 20, which is a liquid crystal display (LCD) device. In the present invention, the anti-Newton ring layer 11b can improve the light scattering intensity in a specific angular range while isotropically transmitting and scattering transmitted light, and therefore can not only prevent Newton rings, but also improve the visibility of the liquid crystal panel 20. More specifically, the anti-Newton ring layer 11b can suppress glare at a display unit of the liquid crystal panel, provides excellent clarity of the transmitted image, and can suppress character blurring at the display surface.

Note that the liquid crystal display device may be a reflective liquid crystal display device that uses external light to illuminate a display unit provided with liquid crystal cells, or may be a transmissive liquid crystal display device provided with a backlight unit to illuminate the display unit. With the reflective liquid crystal display device, incident light is introduced from the outside through the display unit, and transmitted light that has been transmitted through the display unit is reflected by a reflective member and can illuminate the display unit. In the reflective liquid crystal display device, a touch screen in which a polarizing plate and an anti-Newton ring film are combined may be disposed in an optical path in front of the reflective member.

In a transmissive liquid crystal display device, the backlight unit may be provided with a light guide plate (for example, a light guide plate having a wedge-shaped cross section) to cause a light from a light source (a tubular light source such as a cold-cathode tube, a point light source such as a light emitting diode, or the like) to be incident from one side part and emitted from front emission surface. Also, as necessary, a prism sheet may be disposed at the front surface side of the light guide plate.

The display device disposed at a lower part of the touch screen is not limited to a liquid crystal display device, and may be a plasma display device, an organic or inorganic electroluminescent (EL) display device, or other such display device (in particular, a high-resolution LCD and an organic EL display).

EXAMPLES

Hereinafter, the present invention is described in greater detail based on examples, but the present invention is not limited to these examples. The raw materials used in the examples and comparative examples are as described below, and the anti-Newton ring films obtained in the examples and comparative examples were evaluated by the following items.

[Raw Materials]

Acrylic resin having a polymerizable group in a side chain (ACAZ322M): a compound obtained by adding 3,4-epoxycyclohexenyl methyl acrylate to some of the carboxyl groups of a (meth)acrylic acid-(meth)acrylate copolymer; trade name "Cyclomer-P (ACA) Z322M" available from Daicel Corporation; solid content of 40 wt. %, solvent: 1-methoxy-2-propanol (MMPG) (boiling point of 119° C.)

Cellulose acetate propionate (CAP): degree of acetylation=2.5%, degree of propionylation=46%, number average molecular weight of 75000 calibrated with polystyrene; trade name "CAP-482-20" available from Eastman Chemical Company Hexa-functional acrylic-based UV curing monomer (DPHA): trade name "DPHA" available from Daicel-Allnex Ltd.

Tri-functional acrylic-based UV curing monomer (PETRA): trade name "PETRA" available from Daicel-Allnex Ltd.

Fluorine-containing UV curable compound (Polyfox 3320): trade name "Polyfox 3320" available from Omnova Solutions Inc.

Photoinitiator A (Irg184): trade name "Irgacure 184" available from BASF Japan Ltd.

Photoinitiator B (Irg907): trade name "Irgacure 907" available from BASF Japan Ltd.

Hard coat liquid: trade name "Nopcocure SHC-017R" available from San Nopco Limited Polyethylene terephthalate (PET) film: trade name "0321E188", thickness 188 μm, available from Mitsubishi Chemical Corporation

[Haze, Total Light Transmittance, and Parallel Light Transmittance]

The haze was measured in accordance with JIS K7136 using a haze meter ("NDH-5000W" available from Nippon Denshoku Industries Co., Ltd.). During the measurement of haze, the surface having the recessed and protruding structure was disposed facing the optical receiver.

[Transmission Image Clarity]

The image clarity of the anti-Newton ring film was measured in accordance with JIS K7105 using an image clarity meter ("ICM-1T" available from Suga Test Instruments Co., Ltd.) with an optical comb (width of comb teeth=0.5 mm).

[Surface Roughness Ra]

The arithmetic mean roughness (Ra) was measured in accordance with JIS B0601 using a contact type surface roughness meter ("Surfcom 570A" available from Tokyo Seimitsu Co., Ltd.) with a scanning range of 3 mm and the number of scans of two.

[Anti-Newton Ring (ANR) Property]

A transparent conductive layer was formed by sputtering an indium oxide-tin oxide based composite oxide (ITO) onto an anti-Newton ring layer of an anti-Newton ring film, and an upper electrode substrate was thereby formed. The thickness of the transparent conductive layer obtained through this ITO treatment was 0.02 μm. Furthermore, a lower electrode substrate was fabricated by using a glass substrate as the substrate and providing a transparent conductive layer by performing the same ITO treatment. The transparent conductive layer of the lower electrode substrate was coated with a photocurable acrylic resin ("Riston" available from DuPont de Nemours, Inc.) to provide a layer, which was then patterned and subjected to UV exposure to form spacers. Each spacer was cylindrical in its shape, with a height of 9 μm and a diameter of 30 μm, and the spacer interval was set to 3 mm. A touch screen was configured by arranging the upper electrode substrate and the lower electrode substrate fabricated in this manner, with the transparent electrode layers facing each other. The interval between the upper electrode substrate and the lower electrode substrate corresponds to the height of the spacer. The upper electrode substrate of the touch screen was pressed with the tip of a pen at a pressure of 26 g/cm$^2$, and the occurrence of Newton rings was visually confirmed and assessed according to the following criteria.

Good: No Newton's ring appeared, or if appeared, the extent was not concerning.

Marginal: Some Newton rings appeared.

Poor: Newton rings appeared.

[Standard Deviation (Glare Value) of Luminance Distribution of Display]

A smartphone ("Galaxy SII" available from Samsung Electronics Co., Ltd.) was used as a display device, and an anti-Newton ring film of each sample was attached to the surface of the display thereof using an optical glue. Note that the resolution of the display of the smartphone became 217 ppi. In addition, a glare inspection apparatus (available from Komatsu NTC Ltd.) was used to measure the standard deviation of the luminance distribution (glare value) of the display through each of the sample anti-Newton ring films, and the glare was evaluated on the basis of the following criteria. Note that the standard deviation of the luminance distribution (glare value) of the display when an anti-Newton ring film was not attached was used as a blank.

Good: Difference from the blank glare value was less than 2.

Poor: Difference from the blank glare value was greater than or equal to 2.

Example 1

4.0 parts by weight of the acrylic resin having a polymerizable unsaturated group on a side chain, 0.2 parts by weight of cellulose acetate propionate, 20.7 parts by weight of the hexa-functional acrylic-based UV curing monomer, 13.8 parts by weight of the tri-functional acrylic-based UV curing monomer, and the fluorine-containing UV curable compound, the photoinitiator A, and the photoinitiator B of compounding amounts described below were dissolved in a mixed solvent of 37.0 parts by weight of methyl ethyl ketone (MEK) (boiling point of 80° C.), 12.5 parts by weight of 1-butanol (1-BuOH) (boiling point of 113° C.), and 10.1 parts by weight of 1-methoxy-2-propanol (MMPG) (boiling point of 119° C.). This solution was cast onto a PET film using a wire bar #18, and then left in an oven at 80° C. for 60 seconds to evaporate the solvent, and a coating film (anti-Newton ring layer) having a thickness of approximately 7 μm was formed. Note that the ratios of the fluorine-containing UV curable compound, the photoinitiator A, and the photoinitiator B in the anti-Newton ring layer were 0.5 wt. %, 0.7 wt. % and 0.4 wt. %, respectively. Subsequently, the coating film was passed through an ultraviolet irradiation device (available from Ushio, Inc., high pressure mercury lamp, UV irradiation dose: 800 mJ/cm$^2$) and subjected to a UV curing treatment to form a layer (anti-Newton ring layer) having a hard coat property and a surface of a recessed and protruding structure. Furthermore, the hard coat liquid was cast using a wire bar #10 onto a surface on which the anti-Newton ring layer was not formed, and then left in an oven at 80° C. for 60 seconds to evaporate the solvent and form a hard coat layer, and an anti-Newton ring film for testing was obtained.

Examples 2 and 3

Anti-Newton ring films were obtained in the same manner as in Example 1 with the exception that composition of the raw materials and solvent was changed to the compositions shown in Table 1.

Comparative Example 1

An anti-Newton ring film having an anti-Newton ring layer with a thickness of approximately 12 μm was obtained in the same manner as in Example 1 with the exception that the composition of the raw materials and solvent was changed to the composition shown in Table 1, the wire bar for forming the anti-Newton ring layer was changed to #28, and the drying conditions were changed to 50° C. and 30 seconds.

Comparative Example 2

An anti-Newton ring film having an anti-Newton ring layer with a thickness of approximately 8 μm was obtained in the same manner as in Example 1 with the exception that the composition of the raw materials and solvent was changed to the composition shown in Table 1, and the drying conditions were changed to 60° C. and 60 seconds.

Table 2 shows the evaluation results of the anti-Newton ring films obtained in the examples and comparative examples.

TABLE 1

|  | Examples | | | Comparative Examples | |
| --- | --- | --- | --- | --- | --- |
|  | 1 | 2 | 3 | 1 | 2 |
| ACAZ322M | 4.0 | 9.5 | 16.1 | 15.8 | 15.7 |
| CAP | 0.2 | 0.6 | 1.4 | 1.7 | 2.5 |
| DPHA | 20.7 | 19.2 | 19.5 | 19.6 | 15.3 |
| PETRA | 13.8 | 12.8 | 9.1 | 8.4 | — |
| MEK | 37.0 | 37.0 | 36.0 | 39.1 | 49.8 |
| 1-BuOH | 12.5 | 12.5 | 12.7 | 11.4 | 13.4 |
| MMPG | 10.1 | 6.8 | 3.9 | 3.8 | 2.3 |
| Irg184 | 0.7 | 0.7 | 0.7 | 0.3 | 0.5 |
| Irg907 | 0.4 | 0.4 | 0.4 | — | 0.5 |
| Polyfox3320 | 0.5 | 0.5 | 0.1 | 0.04 | — |

Note that the numerical values in Table 1 indicate the "wt. % in the anti-Newton ring layer" with regard to the photoinitiator and the fluorine-containing UV curable compound, and indicate "parts by weight" for the other components.

TABLE 2

|  | Blank | Examples | | | Comparative Examples | |
| --- | --- | --- | --- | --- | --- | --- |
|  |  | 1 | 2 | 3 | 1 | 2 |
| ANR layer thickness (μm) |  | 7 | 7 | 7 | 12 | 8 |
| Haze (%) |  | 0.5 | 0.5 | 1.3 | 3.2 | 5.2 |
| Transmission image clarity (%) |  | 96 | 95 | 94 | 78 | 80 |
| Total light transmittance (%) |  | 92.0 | 91.0 | 90.6 | 90.8 | 91.4 |
| Diffuse transmittance (%) |  | 0.5 | 0.5 | 1.2 | 2.9 | 4.8 |
| Parallel light transmittance (%) |  | 91.5 | 90.5 | 89.4 | 87.9 | 86.6 |
| Ra (nm) |  | 2 | 6 | 9 | 80 | 50 |
| ANR property |  | Marginal | Good | Good | Good | Good |
| Standard deviation of luminance distribution | 4.0 | 4.9 | 5.1 | 5.1 | 8.7 | 7.9 |
| Glare | Good | Good | Good | Good | Poor | Poor |

Figure 2:
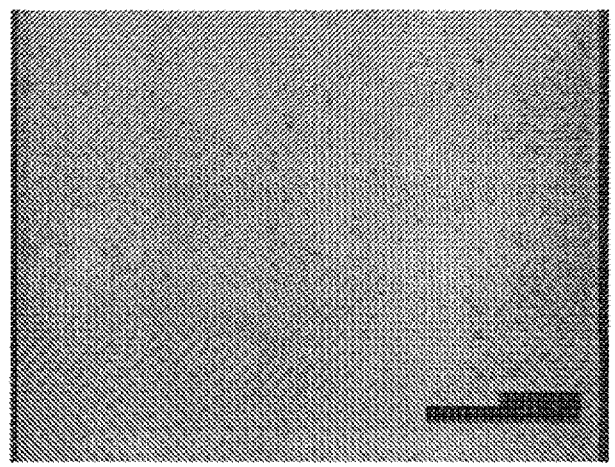
FIG. 2 is a laser microscopy image (10× magnification) of an anti-Newton ring layer surface of an anti-Newton ring film obtained in Example 3.
Figure 3:
FIG. 3 is a laser microscopy image (10× magnification) of an anti-Newton ring layer surface of an anti-Newton ring film obtained in Comparative Example 1.
Figure 4:
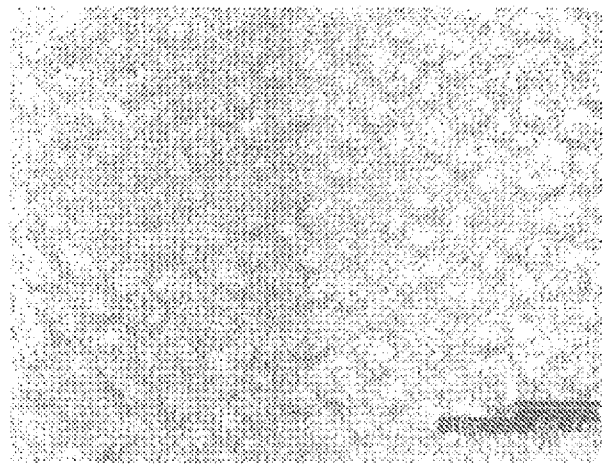
FIG. 4 is a laser microscopy image (10× magnification) of an anti-Newton ring layer surface of an anti-Newton ring film obtained in Comparative Example 2.

As is clear from the results of Table 2, an anti-Newton ring property and low glare were compatibly achieved with the anti-Newton ring films of the Examples, whereas strong glare was exhibited with the anti-Newton ring films of the Comparative Examples. Laser microscopy images (10× magnification) of the anti-Newton ring layer surface of the anti-Newton ring films obtained in Example 3 and Comparative Examples 1 to 2 are shown in FIGS. 2 to 4. As is clear from these microscopy images, a recessed and protruding structure was formed on the surface of the anti-Newton ring layer of the examples in comparison to the comparative examples.

INDUSTRIAL APPLICABILITY

The anti-Newton ring film of the present invention can be used on a touch screen (in particular, a resistive touch screen) that is used in combination with a display device (such as a liquid crystal display device, a plasma display device, and an organic or inorganic EL display device), in a display unit of an electrical, electronic or precision device such as a car navigation display, a smartphone, a mobile phone, a personal computer (PC), a tablet PC, a television, a gaming device, a mobile device, a clock, and a calculator, and from the perspective of being able to achieve both an anti-Newton ring property and low glare, of these applications, the anti-Newton ring film of the present invention is particularly suitable for high-definition LCD and organic EL displays.

REFERENCE SIGNS LIST

10 Touch screen
11 Upper electrode substrate
12 Spacer
13 Lower electrode substrate
11a, 13a Transparent conductive layer
11b Anti-Newton ring layer
11c, 13c Transparent substrate
11d, 13d Hard coat layer
20 Liquid crystal panel

The invention claimed is:

1. An anti-Newton ring film comprising an anti-Newton ring layer containing one or a plurality of polymers and one or a plurality of cured curable resin precursors, wherein the anti-Newton ring film has a transmission image clarity of 92% or greater as measured with an image clarity meter using a 0.5 mm wide optical comb, the anti-Newton ring layer has a phase-separated structure, and an arithmetic mean roughness Ra of a surface of the anti-Newton ring layer is 3 to 15 nm.

2. The anti-Newton ring film according to claim 1, wherein a parallel light transmittance is 90% or greater.

3. The anti-Newton ring film according to claim 1, wherein a haze is 3% or less.

4. The anti-Newton ring film according to claim 1, wherein the anti-Newton ring layer includes a polymer and a curable resin precursor at a weight ratio from 1/99 to 60/40.

5. The anti-Newton ring film according to claim 1, wherein the plurality of polymers includes a (meth)acrylate-based resin having a polymerizable group, and cellulose esters, and a weight ratio of the (meth)acrylate-based resin having a polymerizable group to the cellulose esters ([the (meth)acrylate-based resin having a polymerizable group]/ [the cellulose esters]) is from 80/20 to 99/1.

6. The anti-Newton ring film according to claim 1, wherein the curable resin precursor includes a polyfunctional curable compound having three or more (meth)acryloyl groups, and a fluorine-containing curable compound, and a ratio of the fluorine-containing curable compound in the anti-Newton ring layer is from 0.05 to 1.5 wt. %.

7. The anti-Newton ring film according to claim 1, wherein the anti-Newton ring film does not contain particles.

8. The anti-Newton ring film according to claim 1, comprising the anti-Newton ring layer and a transparent support.

9. A method of manufacturing an anti-Newton ring film described in claim 1, wherein a liquid phase including one or a plurality of polymers, one or a plurality of curable resin precursors, and a solvent is phase separated through spinodal decomposition in association with evaporation of the solvent to form a phase-separated structure, and the curable resin precursor is cured to form an anti-Newton ring layer.

10. An electrode substrate for a resistive touch screen, the electrode substrate including an anti-Newton ring film described in claim 1, and a transparent conductive layer on an anti-Newton ring layer of the anti-Newton ring film.

11. A resistive touch screen comprising the electrode substrate described in claim 10.

12. A method of preventing the occurrence of a Newton's ring in a resistive touch screen using the anti-Newton ring film described in claim 1.

* * * * *